United States Patent
Kosar et al.

(10) Patent No.: US 10,837,604 B2
(45) Date of Patent: Nov. 17, 2020

(54) FLOW SYSTEM FOR AVOIDING PARTICLE AGGLOMERATION

(71) Applicants: SABANCI ÜNIVERSITESI, Istanbul (TR); OZYEGIN ÜNIVERSITESI, Istanbul (TR)

(72) Inventors: Ali Kosar, Istanbul (FR); Kürsat Sendur, Istanbul (FR); Mustafa Pinar Mengüc, Istanbul (FR)

(73) Assignees: SABANCI ÜNIVERSITESI, Istanbul (TR); OZYEGIN ÜNIVERSITESI, Istanbul (TR)

(*) Notice: Subject to any disclaimer, the term of this patent is extended or adjusted under 35 U.S.C. 154(b) by 262 days.

(21) Appl. No.: 15/763,452

(22) PCT Filed: Oct. 22, 2015

(86) PCT No.: PCT/TR2015/050145
§ 371 (c)(1),
(2) Date: Mar. 27, 2018

(87) PCT Pub. No.: WO2017/069712
PCT Pub. Date: Apr. 27, 2017

(65) Prior Publication Data
US 2019/0049071 A1    Feb. 14, 2019

(51) Int. Cl.
*F17D 1/20* (2006.01)
*F28F 13/08* (2006.01)
(Continued)

(52) U.S. Cl.
CPC .............. *F17D 1/20* (2013.01); *B82Y 30/00* (2013.01); *C09K 5/10* (2013.01); *F28F 13/08* (2013.01); *F28F 23/02* (2013.01)

(58) Field of Classification Search
CPC .... F17D 1/20; C09K 5/10; F28F 23/02; F28F 13/08; Y10T 137/0391
(Continued)

(56) References Cited

U.S. PATENT DOCUMENTS 5,298,262 A    3/1994    Na et al.
8,553,333 B2 *  10/2013   Chang ................... B01F 5/0256
                                                       359/619
(Continued)

FOREIGN PATENT DOCUMENTS

| WO | 2011138752 A1 | 11/2011 |
| WO | 2011141775 A1 | 11/2011 |
| WO | 2013030845 A1 | 3/2013 |

OTHER PUBLICATIONS

Stephen U. S, Choi et al. "Enhancing Themal Conductivity of Fluids with Nanoparticles", ASME International Mechanical Engineering Congress & Exposition, Nov. 12-17, 1995. San Francisco, CA.
(Continued)

*Primary Examiner* — Michael R Reid
(74) *Attorney, Agent, or Firm* — Bayramoglu Law Offices LLC

(57) ABSTRACT

A flow system for avoiding particle agglomeration in nanofluids, including a flow restrictive element, wherein the flow restrictive element in use provides sudden expansion to the fluid such that cavitation takes place the fluid upon exiting the flow restrictive element. The flow system includes the flow restrictive element having a hydraulic diameter within a range between 0.5 μm and 250 μm, a vicinity of the flow restrictive element is provided with a heater, adapted to heat the nanofluid in the vicinity of the flow restrictive element.

4 Claims, 4 Drawing Sheets

(a)

(b)

(51) Int. Cl.
*F28F 23/02* (2006.01)
*C09K 5/10* (2006.01)
*B82Y 30/00* (2011.01)

(58) Field of Classification Search
USPC .......................................................... 137/13
See application file for complete search history.

(56) References Cited

U.S. PATENT DOCUMENTS 8,986,322 B2* 3/2015 Kosar ................ A61B 17/3203
606/128
2012/0006509 A1 1/2012 McCants et al.

OTHER PUBLICATIONS

Seok Pil Jang et al. "Role of Brownian motion in the enhanced thermal conductivity of nanofluids" Applied Physics Letters. vol. 84, No. 21, May 24, 2004.
J. Buongiorno, "Convective Transport in Nanofluids", Transactions of the ASME, vol. 128, Mar. 2006.
Yimin Xuan et al. "Heat transfer enhancement of nanofluids", International Journal of Heat and Fluid Flow 21 (2000) 58-64.
Sadik Kakac et al. "Review of convective heat transfer enhancement with nanofluids", International Journal of Heat and Mass Transfer 52 (2009) 3187-3196.
In Cheol Bang et al. " Boiling heat transfer performance and phenomena of Al2O3-water nano-fluids from a plain surface in a pool", International Journal of Heat and Mass Transfer 48 (2005) 2407-2419.
Srinivas Vemuri et al. "Pool boiling of saturated FC-72 on nano-porous surface", International Communications in Heat and Mass Transfer 32 (2005) 27-31.
Denitsa Milanova et al. "Role of ions in pool boiling heat transfer of pure and silica nanofluids", Applied Physics Letters 87, 233107 (2005).
Lazarus Godson et al. "Enhancement of heat transfer using nanofluids—An overview", Renewable and Sustainable Energy Reviews 14 (2010) 629-641.
Sophie Laurent et al. "Magnetic Iron Oxide Nanoparticles: Synthesis, Stabilization, Vectorization, Physicochemical Characterizations, and Biological Applications", Chem. Rev. 2008, 108, 2064-2110.
William B Krantz et al. "A Novel Primer to Prevent Nanoparticle Agglomeration in Mixed Matrix Membranes", American Institute of Chemical Engineers, Sep. 2007 vol. 53, No. 9.

* cited by examiner

FLOW SYSTEM FOR AVOIDING PARTICLE AGGLOMERATION

CROSS REFERENCE TO RELATED APPLICATIONS

This application is the national phase entry of International Application No. PCT/TR2015/050145, filed on Oct. 22, 2015, the entire contents of which are incorporated herein by reference.

TECHNICAL FIELD OF THE INVENTION

The present invention relates to a flow system for elimination of particle agglomeration in nanofluids.

BACKGROUND OF THE INVENTION

Nanofluids having nanoparticles of various sizes, types, and shapes have been investigated by many researchers. Nanofluids have been utilized in various studies to enhance the performance of single (Choi S U, Eastman J A (1995) Enhancing thermal conductivity of fluids with nanoparticles (No. ANL/MSD/CP-84938; CONF-951135-29). Argonne National Lab., IL, USA; Jang S P, Choi S U (2004) Role of Brownian in the enhanced thermal conductivity of nanofluids. Appl. Phys. Letters 84: 4316; Buongiorno J (2006) Convective Transport in Nanofluids. J. Heat Transfer 128: 240-250; Xuan Y, Li Q (2000) Heat transfer enhancement of nanofluids. Int. J. Heat Fluid Flow 21: 58-64; Kakac S, Pramuanjaroenkij A (2009) Review of convective heat transfer enhancement with nanofluids. Int. J. Heat Mass Transfer 52: 3187-3196; Bang I C, Chang S H (2005) Boiling heat transfer performance and phenomena of Al2O3 water nanofluids from a plain surface in a pool. Int. J. Heat. Mass Trans. 48: 2407-2419;) and two phase (Vemuri S, Kim K J (2005) Pool boiling of saturated FC-72 on nano-porous surface. Int. Commun. Heat. Mass 32: 27-31; Milanova D, Kumar R (2005) Role of ions in pool boiling heat transfer of pure and Silica nanofluids. Appl. Phys. Letters 87: 233107; Godson L, Raja B, Lal D M, Wongwises S (2010) Enhancement of heat transfer using nanofluids—An overview. Renewable Sustainable Energy Rev. 14: 629-641; Laurent S, Forge D, Port M, Roch A, Robic C, Elst L V, Muller R N (2008) Magnetic iron oxide nanoparticles: synthesis, stabilization, vectorization, physicochemical characterizations, and biological applications. Chem. Rev. 108: 2064) systems, as they find applications in thermal management, drug delivery, and refrigeration.

Nanofluids are considered to be the next-generation heat transfer fluids as they offer exciting new possibilities to enhance heat transfer performance compared to pure liquids. Conventional fluids such as water, ethylene glycol and oils have limited thermal properties in comparison with nanofluids. Increasing thermophysical properties of classical fluid coolants by adding metallic or non-metallic solid nanoparticles (NPs), with average sizes of 1-100 nm, to conventional fluids for better heat transfer performance was first introduced (by Choi and Eastman, 1995) stating that there are many advantages of nanofluids over classical fluids, such as high specific surface area, high dispersion stability with predominant Brownian motion of nanoparticles, reduced pumping power to reach the same heat transfer intensification, reduced particle clogging, adjustable properties (e.g. thermal conductivity and wettability, adjustable by using different fraction ratios). It was observed that random movement (Brownian motion) of the nanoparticles (Jang and Choi, 2004; Buongiorno, 2006) and thermophoresis (Xuan and Li, 2000; Kakac and Pramuanjaroenkij, 2009) augment the energy transport process significantly when there is no bulk fluid motion. However, their limited durability and reusability constitute a challenge in their use as commercial products in many applications such as thermal management, drug delivery, and refrigeration. A gradual agglomeration of nanoparticles in nanofluids occurs with time and is accelerated by heating and boiling/evaporation of nanofluids due to desorption and evaporation of the coating from the particle surface and the increase in volume fraction of the nanofluid and with their repetitive use in confined spaces (Bang and Chang, 2005; Vemuri and Kim, 2005; Milanova and Kumar, 2005; Godson et al., 2010). As a result, both the stability and reusability of nanofluids decrease with time thereby shortening their shelf life. Prior art of the accordant subject involves the use of surfactants to avoid agglomeration and sedimentation of nanoparticles in nanofluids. Coatings such as the bilayer lauric acid coating generate a steric repulsion among particles, which keeps them dispersed in the base fluid and contribute to the stability of nanofluids (Laurent S, Forge D, Port M, Roch A, Robic C, Elst L V, Muller R N (2008) Magnetic iron oxide nanoparticles: synthesis, stabilization, vectorization, physicochemical characterizations, and biological applications; Chem. Rev. 108: 2064).

Prior art of the accordant subject involves the use of surfactants to avoid agglomeration and sedimentation of nanoparticles to form nanofluids. Coatings such as the bilayer lauric acid coating generate a steric repulsion among particles, which keeps them dispersed in the base fluid and contribute to the stability of nanofluids (Laurent et al., 2008). For example, in US 2012 0 006 509 A1, surfactants such as 1-dodecane sulfonic acid or its salt (e.g., sodium 1-dodecane sulfonic acid) were suggested to avoid agglomeration. In U.S. Pat. No. 5,298,262, the use of ionic cloud point modifiers was recommended for this task. Also a novel primer-sulfonated poly(ether sulfone) (SPES) was proposed for prevention of nanoparticle agglomeration in mixed matrix membranes (Li, Y., Krantz, W. B., Chung, T.—(2007) A novel primer to prevent nanoparticle agglomeration in mixed matrix membranes; AIChE Journal, 53: 2470). Surfactants are being continuously used over time to prevent any agglomeration and are considered as a major solution for stability of nanofluids. However, their impact to some processes may not be desirable.

SUMMARY OF THE INVENTION

Primary object of the present invention is to eliminate the above-mentioned shortcomings in the prior art.

A further object of the present invention is to provide a system and method for keeping average particle size in nanofluids low thus for keeping performance of nanofluids high even after repetitive flow cycles.

The present invention proposes a flow system for avoiding particle agglomeration in nanofluids, comprising a flow restrictive element which in use provides sudden expansion to the fluid such that cavitation takes place in the fluid upon exiting the flow restrictive element.

BRIEF DESCRIPTION OF THE DRAWINGS

The figures, brief explanations of which are given below, solely serve for provision of a better understanding of the present invention and are as such not intended to define the scope of protection or the context in which said scope is to be interpreted in the absence of the description.

DETAILED DESCRIPTION OF THE INVENTION

The present application proposes a high efficiency system and related method to maintain the performance and stability of nanofluids by preventing agglomeration and sedimentation of nanoparticles so that the durability of nanofluids will be increased. Avoiding agglomeration and deposition of nanoparticles in nanofluids provides significant contribution to their extensive use, enhanced durability and reusability of nanofluids in many applications such as electronics cooling, microreactors, biotechnology, air conditioning, refrigerators, and thermophotovoltaic cells as new generation working fluids.

Figure 1:
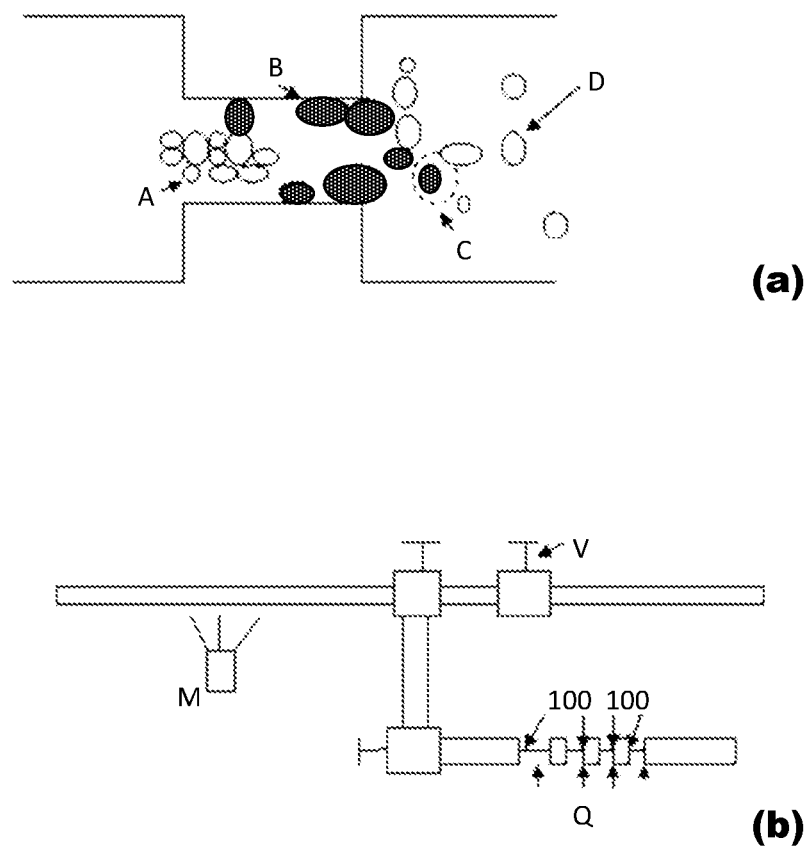
FIG. 1 schematically represents (a) detail of the vicinity of the flow restrictive element representing formation and collapse of the cavitation bubbles and their effect on nanoparticle agglomerates, and (b) a schematic view of an embodiment according to the present invention.

An exemplary schematics of a system according to the present application is represented in FIG. 1(b) and the occurrence of cavitation and its effect on crushing of nanoparticles agglomerates is represented in FIG. 1(a). The code letters and numerals given in the figures are explained below:
100 Flow restrictive elements
A Agglomerate of nanoparticles
B Bubble emerged by cavitation
C Collapsing bubble
D Nanoparticle, dispersed after exiting from a flow restrictive element
M DLS measurement
Q Heat provided onto the flow restrictive elements
V Flow regulating valve In an experimental work related with this application, average size of nanoparticles was measured with an in-situ DLS (Dynamic Light Scattering) equipment integrated to the system. With time, average nanoparticle size increases due to heating and boiling/evaporation of nanofluids and desorption and evaporation of a coating from the particle surface, which coating aims for functionalization of the surface, or for improving the stability of the fluid in terms of flow properties or heat transfer performance. At a critical size of nanoparticle agglomerate, the particles might block any flow passages or lead to sedimentation onto any channel walls.

To prevent this, the nanofluid is guided to a flow restrictive element such as orifice or venturi having a hydraulic diameter within the range between 0.5 µm and 250 µm, configured for causing cavitation in a nanofluid upon exiting the flow restrictive element.

The flow restrictive element is preferably a short flow restrictive element by having an L/D (i.e. ratio of flow passage length to hydraulic diameter) value of fluid passage within the range between 1 and 100, such ratio provides an amplified Vena Contracta effect and ensures a low (i.e. minimum available) system pressure within the flow restrictive element. Preferably, the system comprises a plurality of such flow restrictive elements arranged in series.

Further, the vicinity of the flow restrictive element is preferably provided with a heater, preferably with a film heater which is more preferably deposited in vicinity of the flow restrictive element, such that, in use, nanofluid can be heated by the film heater in vicinity of the flow restrictive element, preferably before entering to the flow restrictive element, even more preferably also whilst flowing through the flow restrictive element.

Upon exiting from the flow restrictive element a sudden pressure drop occurs, and the elevated fluid temperature due to heating by the film heater and reduced pressure due to sudden pressure drop occurring upon exiting the flow restrictive element, phase change (i.e. occurrence of cavitating bubbles) takes place, thus submicron to micron-sized bubbles emerge in vicinity of the deposited film heater (e.g. on surface thereof). The bubbles suddenly collapse and thus interact with agglomerates of nanoparticles in vicinity thereof, and decrease their size by directly hitting thereto or by effect of shock waves generated by the collapse.

In the case of metallic nanoparticles present in nanofluids, additional heat transfer effect can be obtained by employing plasmonic near-field radiative heat transfer enhancement. To this end, an inner wall of the pipeline comprising said flow restrictive element, more preferably an inner wall of the flow restrictive element itself, comprises a plasmonic material preferably in form of a layer, more preferably in form of a thin plasmonic metallic layer. Metals such as Silver, Copper, Gold or Aluminum, preferably a noble metal, can be coated or plated on the walls of the flow restrictive element, comprised by the wall material (e.g. as an alloy comprising such plasmonic metal) of the flow restrictive element, or used as the wall material of the flow restrictive element itself, such that localized heat transfer to nanoparticles can be further enhanced and nanoparticles can be excited, which further contributes to the stability of the nanofluid. Said wall is preferably an inner wall of the flow restrictive element. Said plasmonic metals are to be chosen by having negative permittivity values, low values of optical loss constant to provide long enough plasmon propagation distance, when subjected to optical frequencies. For instance, as a suitable plasmonic metal for use in the plasmonic metallic layer, Aluminum shows a negative value of permittivity and a low value of optical loss constant when subjected to UV frequencies.

Engineered metamaterials can also be employed by including them as wall material in the system according to the present invention, for provision of enhanced performance thereto. By using multiple conventional materials, such as metals or plastics, in various geometric configurations, one can obtain optical and heat transfer properties much different than the individual constituents. Significant heat transfer enhancement can be achieved by proper selection of the materials, shapes, and compositions of the conventional materials.

As a result, at the exit of the flow restrictive element, average nanoparticle size in the nanofluid decreases and thus stability of the nanofluid is enhanced in terms of excitation of nanoparticles in the nanofluid, maintaining its heat transfer performance and flow properties (i.e. clogging of flow paths and unexpected fluid properties values in the nanofluid due to agglomeration of nanoparticles are eliminated). To increase this effect, the nanofluid could be passed through a plurality of flow restrictive elements configured in series, which are formed using standard microfabrication techniques such as lithography and chemical or dry etching as well as micromachining tools, and integrated to the systems using suitable fittings.

For further increasing the nucleation activity from the walls due to cavitation and boiling via heating, the system according to the present invention can be provided with an optical source such a LASER diode, preferably in the vicinity of the flow restrictive element, more preferably at the flow restrictive element itself. In case where nanoparticles comprise a plasmonic material, optical frequency provided by the optical source may enhance heating of the nanofluid by occurrence of resonance conditions which depend to the material, geometry and size of the nanoparticles.

Thus, a careful selection of optical frequency provided by the optical source, the nanoparticle size and shape can improve (i.e. accelerate) the heating of the nanoparticles by occurrence of resonance in vicinity of the flow restrictive element. Said selection is preferably made such that, when the LASER diode is in use, nanoparticles show a negative permittivity value due to materials comprised by nanoparticles, shape (i.e. geometry) or size of nanoparticles. Suitable optical frequencies (e.g. LASER frequencies) in this context produce resonance conditions in terms of plasmonic behavior at nanoparticles. For instance, globe-shaped golden nanoparticles having radii of 30 nanometers show resonance at 550 nm wavelength within the air which roughly corresponds to $5.45 \times 10^{15}$ Hertz, and in the context according to the present embodiment, this wavelength is suitable for being applied onto a nanofluid comprising such golden nanoparticles.

Also a method for elimination of particle agglomeration in nanofluids is proposed within the context according to the present invention. Said method comprises conducting the nanofluid through a pipeline comprising one or more flow restrictive element having hydraulic diameter within the range between 0.5 μm and 250 μm, such that, cavitation occurs in nanofluid upon exiting the flow restrictive element.

In a preferred variation of the method according to the present invention, the flow restrictive element has a ratio of flow passage length to hydraulic diameter within the range between 1 and 100.

In a preferred variation of the method according to the present invention, the vicinity of the flow restrictive element is heated, preferably with a film heater, more preferably with a film heater deposited in vicinity of the flow restrictive element, such that the nanofluid is heated by the film heater in vicinity of the flow restrictive element, preferably before entering to the flow restrictive element, even more preferably also whilst flowing through the flow restrictive element.

In a preferred variation of the method according to the present invention, an inner wall of the pipeline, more preferably an inner wall of the flow restrictive element itself, comprises a plasmonic material, preferably the plasmonic material is in form of a layer, more preferably in form of a thin plasmonic metallic layer; the nanofluid comprises metallic nanoparticles, and plasmonic near field radiative heat transfer is applied onto the nanofluid.

In a preferred variation of the method according to the present invention, the nanoparticles in the nanofluid comprise a plasmonic material, and a suitable optical frequency is applied upon the nanofluid for occurrence of resonance due to said plasmonic material, nanoparticle geometry and nanoparticle size.

Figure 2:
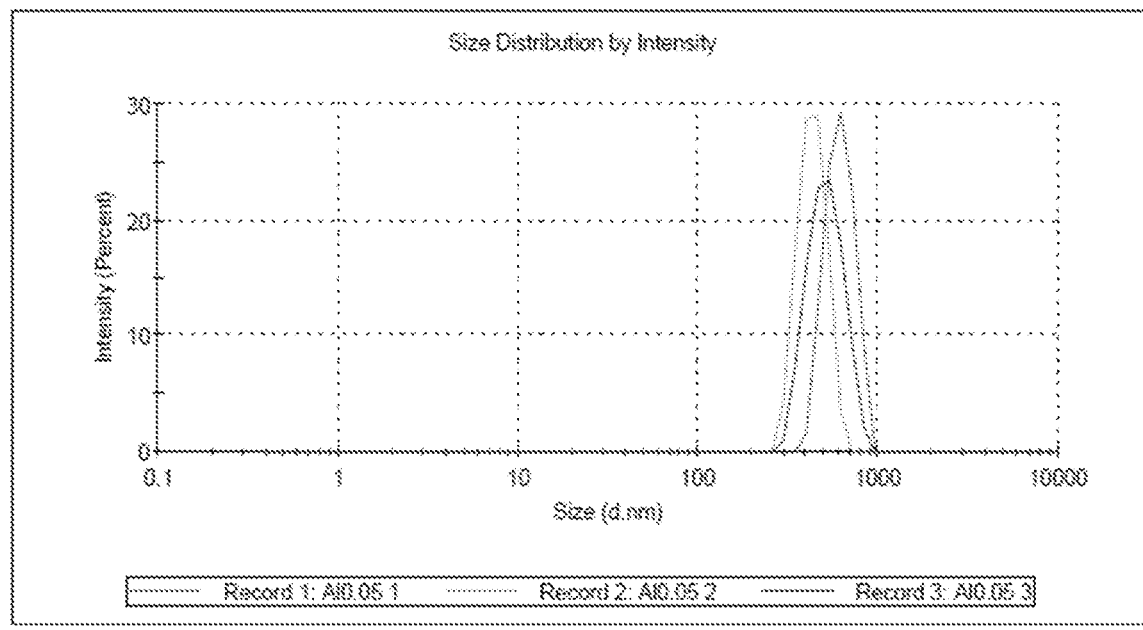
FIG. 2 shows average agglomerate diameter measurements for the nanofluid (a) upon preparation thereof, before heating; (b) upon heating; and (c) upon being subjected to cavitation in vicinity of the flow restrictive element.
Figure 2:
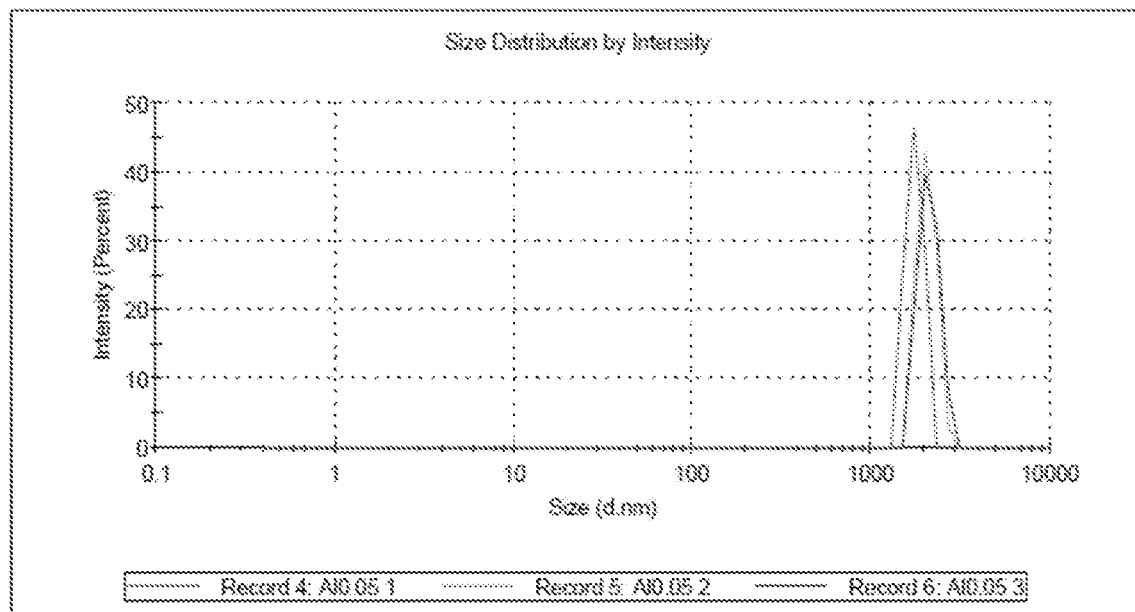
Figure 2:
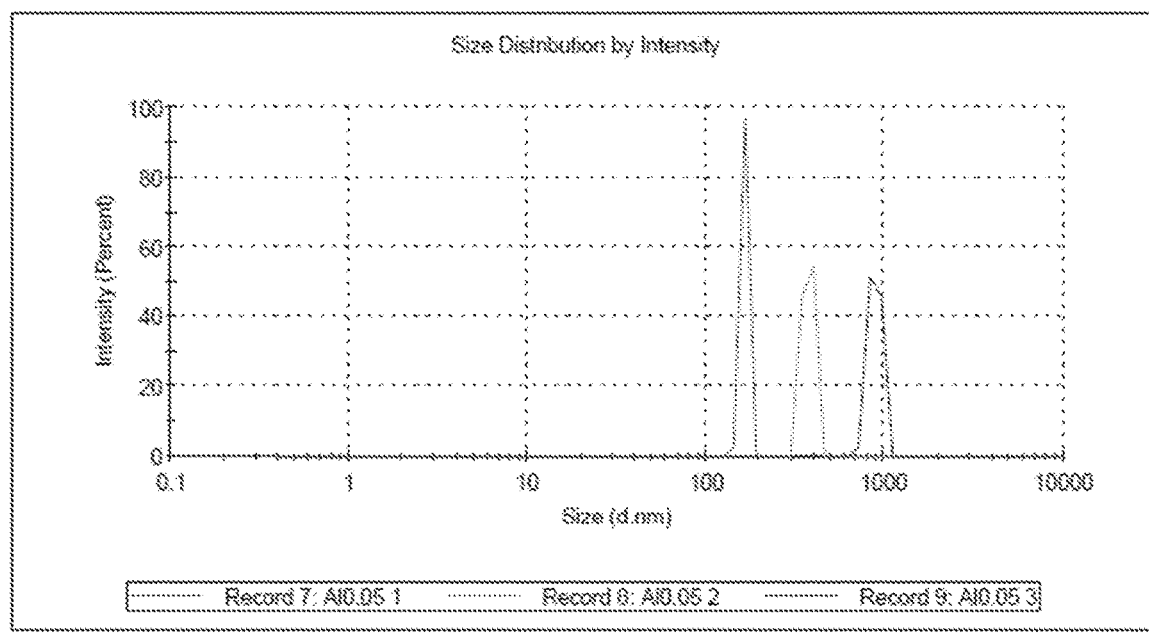

FIG. 2 provides validation of the performance obtained at the experiments using a setup corresponding to the system according to the present invention. The experimental setup comprises one micro orifice with an inner diameter of 147 μm and a length of 0.5 cm which corresponds to an aspect ratio of (L/D) about 34; which can be considered as a low aspect ratio orifice, or a short orifice. The average particle size of the nanoparticle agglomerates in the nanofluid was measured with the DLS method. FIG. 2(a) shows the average agglomerate diameter measurement results for the nanofluid upon preparation thereof, before heating. Here, DLS (Dynamic Light Scattering) results of the prepared nanofluid consisting or the base fluid (water) and $Al_2O_3$ nanoparticles (with a weight fraction of 0.05%) are presented. The initial average particle size (average diameter of nanoparticles or their agglomerates) was measured to be around 615 nm as shown in FIG. 2(a).

FIG. 2(b) shows the average agglomerate diameter measurement results for the nanofluid upon heating. As seen in FIG. 2(b), the average particle size was increased to 1737 nm with heating to a temperature close to saturation temperature of the nanofluid, which was about 100° C. in this experimental case.

This clearly shows agglomeration of nanoparticles upon boiling. When the fluid passed through the micro orifice under cavitating flow conditions at an inlet pressure of 50 atm, it was guided to a container. Sample collecting vessel for DLS measurements given in FIG. 2(c), which shows the average agglomerate diameter measurement results for the nanofluid upon being subjected to cavitation in vicinity of the flow restrictive element. As seen in FIG. 2c, the average particle size dropped to a value of 163 nm, which shows that the experimental system effectively reduces average particle size by breaking nanoparticle agglomerates and improves reusability of nanofluids.

The proposed system and related method offers interesting practical applications in thermal management, refrigeration, drug delivery, and heat sink design of the nanofluids while maintaining their stability. The proposed method and system does not involve any use of extensive surfactants or surface modifiers, which might alter thermophysical properties of nanofluids, badly influence their performance and biocompatibility, and limit their effectiveness.

The system and method according to the present invention is also very economical since no expensive chemicals are included. Integration of flow restrictive elements and heaters could be accomplished by standard microfabrication tools and techniques and standards fittings. The proposed method and system takes the forces of nature such as sudden expansion and additional heat transfer via plasmonic near-field radiation transfer, into effect.

Thus, the below objects are achieved by the system and related method according to the present invention:
- The above-mentioned shortcomings in the prior art are eliminated,
- A system and method is proposed for keeping average particle size in nanofluids low thus for keeping performance of nanofluids high even after repetitive flow cycles.

We claim:

1. A method for elimination of particle agglomeration in a nanofluid, comprising: conducting the nanofluid through a pipeline comprising at least one flow restrictive element having a hydraulic diameter within a range between 0.5 μm and 250 μm and having a ratio of flow passage length to hydraulic diameter within the range between 1 and 100, such that, cavitation takes place in the nanofluid upon exiting the at least one flow restrictive element, by heating the nanofluid in vicinity of the at least one flow restrictive element, wherein an inner wall of the pipeline, or an inner wall of the at least one flow restrictive element itself, comprises a plasmonic material, and the nanofluid comprises metallic nanoparticles, and plasmonic near field radiative heat transfer is applied onto the nanofluid.

2. The method according to claim 1, wherein the nanofluid is heated by a film heater.

3. The method according to claim 1, wherein nanoparticles in the nanofluid comprise a plasmonic material, and a suitable optical frequency is applied upon the nanofluid for occurrence of resonance due to the plasmonic material, nanoparticle geometry and nanoparticle size.

4. The method according to claim 1, wherein an inner wall of the pipeline, or an inner wall of the at least one flow restrictive element itself, comprises a plasmonic material, and the nanofluid comprises metallic nanoparticles, and plasmonic near field radiative heat transfer is applied onto the nanofluid.

* * * * *